Patented Aug. 19, 1924.

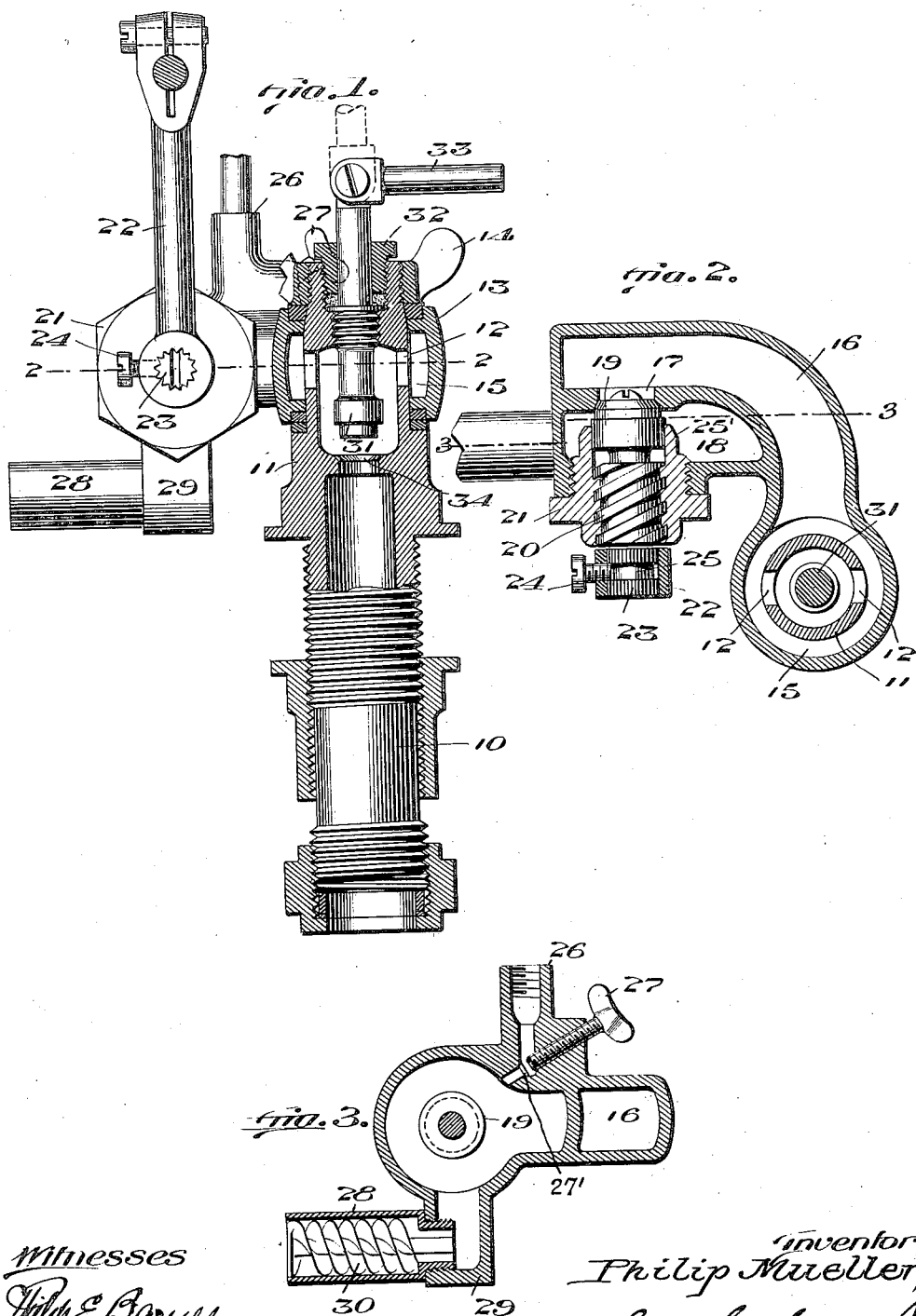

1,505,278

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FLUSH VALVE FOR TANKS.

Application filed November 12, 1919. Serial No. 337,483.

*To all whom it may concern:*

Be it known that I, PHILIP MUELLER, a citizen of the United States, residing at Decatur, in the county of Macon and State of Illinois, have invented new and useful Improvements in Flush Valves for Tanks, of which the following is a specification.

The present invention relates to inlet valves for tanks, particularly flush tanks for closets, and has for its object to provide a valve which is capable of easy operation by the float; which will open and close quickly as the water falls and rises; and which will seat smoothly and accurately so as to insure a complete cutting off of the flow when the tank has filled to the required height.

A further object of the invention is to provide a tank valve in which the supply may be readily cut off at the tank in case repairs are necessary, such cut-off being so arranged that the entire valve may be conveniently removed from the supply stub which projects into the tank.

A further object of the invention is to provide a valve in which the after-fill passage may be conveniently regulated without the necessity of any special tools, the regulating device being so arranged that it is easily accessible.

A further object is to provide a valve which is equally available for low pressure or high pressure water systems, and in which the fill will be noiseless under high pressure conditions, provision being made where low pressure conditions exist for readily cutting out the high pressure flow impeding and silencing device.

In the drawings:

Figure 1 is a side view, partly in section, of a valve embodying my improvement.

Figure 2 is a sectional view on the line 2—2 of Figure 1.

Figure 3 is a sectional view substantially on the line 3—3 of Figure 2.

Referring to the drawings by numbers, like numbers indicating like parts in the several views, 10 indicates the tank connection pipe, which may be of any suitable construction, provided at its upper end with the inlet stub 11. The said inlet stub has at its upper end the usual machined projection provided with ports 12, on which ported projection is mounted the chamber 13 of the valve body, the valve body being clamped to the stub by means of the wing nut 14 threaded to the upper end of the stub 11, the joints being provided with suitable packing to give a tight connection. This connection permits the valve body to swivel on the stub, so that any angular position of the valve body may be secured, thus adapting the fitting to a variety of different positions so as to meet different conditions under which it may be installed. The valve body is chambered at 15, as shown, so as to form an annular chamber with the stub 11 leading by the curved and laterally offset passage 16 to the port 17, which port delivers to the chamber 18, and thence to the outlet of the valve. The port 17 is controlled by the valve 19, of the quick compression type, as shown in the present instance, the stem of this valve having the quick thread 20 mounted in the nut 21 threaded into the wall of the valve body, as shown in Fig. 2.

The outer end of the valve stem receives the operating arm 22, at the upper end of which the float and its connections (not shown) are mounted so as to operate the valve. The arm 22 is adjustably secured by means of the corrugated end 23 of the valve stem, so that an angular adjustment of the arm 22 may be secured, a set screw 24 engaging in a groove 25 between the corrugated sections 23 of the valve stem to lock the arm 22 against endwise movement when it has been finally adjusted.

It is essential, of course, that the valve 19 and its operating screw 20 move freely and easy, for any tightness of the screw 20 in the nut 21 would prevent its quick operation by means of the relatively light float which is commonly used in this type of valve, but it is also essential that the valve 19 shall seat accurately in closing the port 17 in order not only to prevent leakage but to prevent uneven wear of the valve 19 by reason of its not coming always squarely to its seat. In order to insure this, and prevent the loose play of the screw 20 from resulting in an inaccurate seating of the valve I extend a skirt 25' from the nut 21 into the chamber 18 and about the body portion of the valve 19, the skirt 25' fitting the valve body closely, and having an extended bearing thereon so as to accurately direct its movements to and from the valve and yet not interfere with its free opening and closing. By this construction I am enabled to secure the necessary looseness of the screw 20 to give a freely moving valve, and at the same time any undesirable play of the valve is prevented.

The after-fill for valves of this character must, in many instances, be regulated to the pressure, and in order to conveniently accomplish this I provide the after-fill passage 26 with a regulating screw 27 which projects into the passage of the after-fill, as shown in Figure 3, and by means of which the area of this passage may be more or less restricted. As these valves are located at the bottom of the tanks, and therefore not readily accessible, I have mounted the screw 27, as shown in Figure 3, inclined to the passage 26, so that it is easily accessible for adjustment, lying naturally in a position where it may be manipulated without the use of any special tools, this inclined position, as will be obvious from Figure 3, leaving the head or wings of the screw clear from the sides of the valve so as not to interfere with its manipulation.

The said screw 27 serves not only as a regulating screw for the after-fill, but also as a cut-off, this latter function being accomplished by providing a seat 27' in the side wall of the passage 26, upon which the valve 27 seats when screwed in and effectually closes off flow through the after-fill passage 26.

In order to adapt the valve to high or low pressure systems, so that it is readily convertible, I have provided a silencer 28 which is removably mounted in a depending lug 29 from the valve body, this silencer having a spiral passage 30, which will impede the flow of water sufficiently to overcome the objectionable hissing which occurs under high pressure conditions, without, of course, interfering with the proper volume. The said silencer 28 is in the form of a short barrel which is threaded into the lug 29, from which it may be readily removed if low pressure conditions exist, which do not require its presence, and under which conditions the silencer might impede the flow to an undesirable extent.

It sometimes happens that repairs are necessary to the valve and float parts, which necessitate the removal of the valve, and frequently the water must be cut off at the main inlet of the system, or at some cut-off located in the pipes leading to the tank. In the present construction I have provided means whereby the entire valve and its parts may be removed from the stub without the necessity of cutting off the supply at any point outside the tank. The stub 11 has a passage leading through its upper end, in which is mounted a cut-off valve 31, the stem of which projects upwardly and is threaded in the stub 11, a packing or gland nut 32 being provided to insure a tight joint above the screw threads of the valve stem, and at its upper end the stem is provided with a hinged or pivoted handle 33 by means of which the valve 31 may be rotated and screwed down to the seat 34 formed in the supply pipe, as shown in Fig. 1. When the valve 31 is seated and the supply cut off, the handle 33 can be thrown to the dotted line position shown in Fig. 1, after which the wing nut 14 which clamps the valve body 13 to the stub may be taken off and the valve and its associated parts removed, the dimensions of the valve body orifice and the wing nut being such that they will pass readily over the gland nut 32, valve stem, and handle 33 when brought to the dotted line position.

It is obvious that departures from the construction here shown and described may be made without departing from the principle of my invention, and all such expedients and variations as fall within the range of mechanical skill I regard as within the purview of my invention.

I claim:—

1. The combination with a pipe having a ported valve receiving stub, of a valve body removably mounted on said stub and forming an annular chamber between the stub and the valve body, a valve seat in said pipe, a cut-off valve in said stub having a projecting valve stem, and a valve operating means on said stem.

2. The combination with a pipe having a ported valve-receiving stub, of a valve body mounted on said stub and removable therefrom in an axial direction, an annular chamber formed between the stub and the valve body, a valve seat in said pipe on the inlet side of the ports in said stub, a cut-out valve tapped into the end of said stub and having a projecting valve stem, and valve operating means on said stem movable from operating to a neutral position to permit said valve body to be removed from said stub.

3. The combination with a pipe having a ported valve-receiving stub, of a valve body mounted on said stub and removable therefrom in an axial direction, an annular chamber formed between the stub and the valve body, a valve seat in said pipe on the inlet side of the ports in said stub, a cut-out valve tapped into the end of said stub and having a projecting valve stem, and a valve operating handle on said stem movable from a position angular to said valve stem to a position in alignment therewith to permit said valve body to be removed from said stub.

4. The combination with a pipe having a ported valve-receiving stub, a valve body mounted on said stub, an annular chamber formed between the stub and the valve body, means engaging the end of said stub to secure said valve body in place, a valve seat in said pipe on the inlet side of the ports in said stub, a cut-out valve tapped into the end of said stub and adapted to engage said seat, a packing gland threaded into said stub about the stem of said valve, and an operating handle pivoted on the projecting end of said valve stem and movable from a position angular to said stem to a position in line therewith to permit removal of said valve body securing means and valve body axially from said stub.

5. The combination with a pipe having a ported valve-receiving stub, a valve body mounted on said stub, an annular chamber formed between the stub and the valve body, a clamping nut threaded to the end of the stub to secure said valve body in place, a valve seat in said pipe on the inlet side of the ports in said stub, a cut-out valve tapped into the end of said stub and adapted to engage said seat, a packing gland threaded into said stub about the stem of said valve, and an operating handle pivoted on the projecting end of said valve stem and movable from a position angular to said stem to a position in line therewith to permit removal of said clamping nut and said valve body axially from said stub.

6. The combination with a valve body, of a pipe having a ported valve-receiving stub, a valve in said stub, operating means for said valve extending outside of said stub, said valve body comprising a valve chamber, a lateral offset passage communicating the chamber with said stub, a valve seat in said chamber, a valve in said chamber adapted to engage said seat, and means external of said valve body for actuating said last mentioned valve.

7. The combination with a valve body, of a pipe having a ported valve-receiving stub, a valve in said stub, operating means for said valve extending outside of said stub, said body comprising a valve chamber, a lateral offset passage communicating the chamber with said stub, a valve seat in said chamber, a valve in said chamber adapted to engage said seat, a valve support loosely engaging the stem of said valve, and a skirt extending from said support and engaging the valve to form an extended bearing therefor.

8. The combination with a valve body, of a pipe having a ported valve-receiving stub, a valve in said stub, operating means for said valve extending outside of said stub, said valve body comprising a valve chamber, a lateral offset passage communicating the chamber with said stub, a valve seat in said chamber, a valve in said chamber adapted to engage said seat, a valve supporting nut removably mounted in the wall of said valve body, said nut having a threaded bore to loosely engage the stem of said valve, and a skirt extending from said nut and engaging said valve to form an extended bearing therefor.

9. The combination with a valve body, of a pipe having a ported valve-receiving stub, a valve in said stub, operating means for said valve extending outside of said stub, said valve body comprising a valve chamber, a lateral offset passage communicating the chamber with said stub, a valve seat in said chamber, a valve in said chamber adapted to engage said seat, means external of said valve body for actuating said valve, an after-fill passage leading from said valve body, and a regulating screw for said passage mounted in said valve body and inclined with respect to said passage.

10. The combination with a valve body, of a pipe having a ported valve-receiving stub, a valve in said stub, operating means for said valve extending outside of said stub, said valve body comprising a valve chamber, a lateral offset passage communicating the chamber with said stub, a valve seat in said chamber, a valve in said chamber adapted to engage said seat, means external of said valve body for actuating said valve, an outlet orifice in said valve body and a flow-impeding member removably attached to the valve body at said orifice.

11. The combination with a valve body, of a pipe having a ported valve-receiving stub, a valve in said stub, operating means for said valve extending outside of said stub, said body comprising a valve chamber, a lateral offset passage communicating the chamber with said stub, a valve seat in said chamber, a valve in said chamber adapted to engage said seat, a valve support loosely engaging the stem of said valve, a skirt extending from said support and engaging the valve to form an extended bearing therefor, an outlet orifice in said valve body and a horizontally disposed flow-impeding member removably attached to the valve body at said orifice.

In testimony whereof I have hereunto set my hand.

PHILIP MUELLER.